Nov. 1, 1938.　　　　G. A. ANDERSON　　　　2,134,995
ADJUSTABLE STROKE AND SHOCK ABSORBING CONNECTING ROD
Filed Nov. 13, 1935
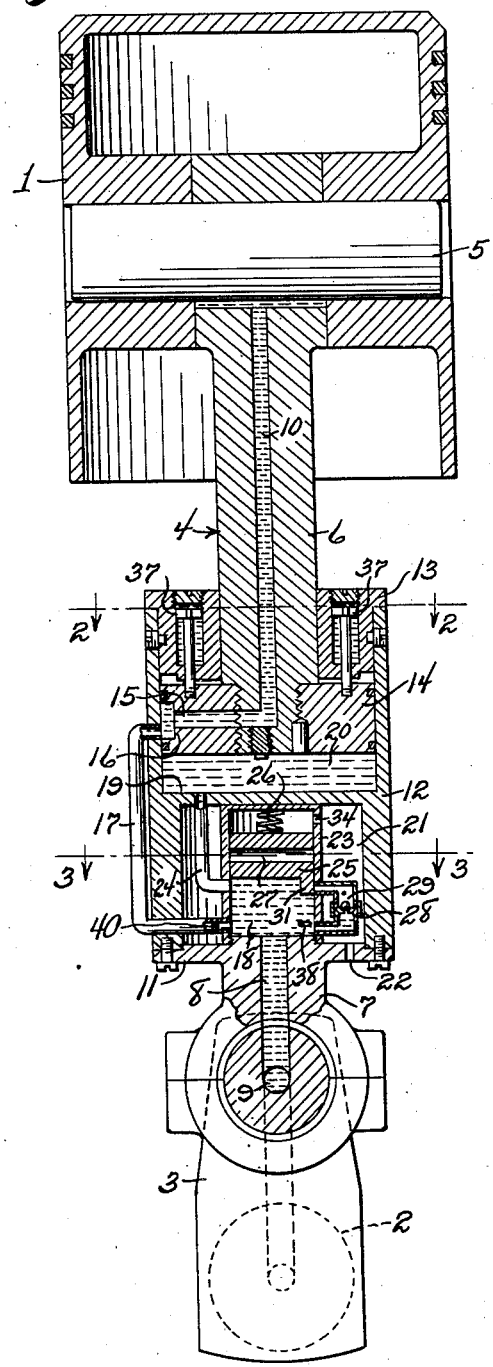
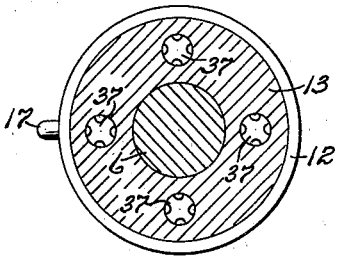
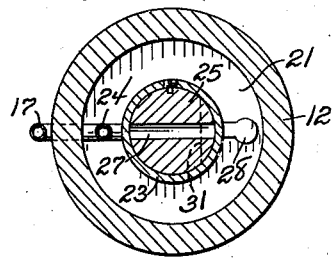
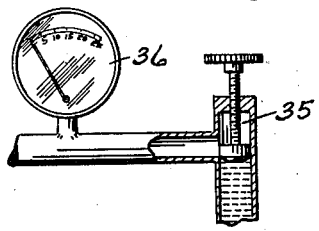
George A. Anderson
INVENTOR
BY Victor J. Evans & Co.
ATTORNEY Patented Nov. 1, 1938

2,134,995

UNITED STATES PATENT OFFICE 2,134,995

ADJUSTABLE STROKE AND SHOCK ABSORBING CONNECTING ROD

George A. Anderson, Alameda, Calif.

Application November 13, 1935, Serial No. 49,581

3 Claims. (Cl. 123—48)

This invention relates to connecting rods for internal combustion engines, and has for the primary object the provision of a device of this character which provides the usual connection between a piston and the crank on a crank shaft of an engine and is capable of absorbing initial explosion impulses to reduce vibration and wear to a minimum. The invention also provides means whereby the length of the stroke of the piston may be varied to increase and decrease the compression of the engine.

With these and other objects in view, this invention consists in certain novel features of construction, combination and arrangement of parts to be hereinafter more fully described and claimed.

For a complete understanding of my invention, reference is to be had to the following description and accompanying drawing, in which:

Figure 1 is a vertical sectional view illustrating my invention adapted to the crank of the crank shaft and the piston of an engine.

Figure 2 is a sectional view taken on the line 2—2 of Figure 1.

Figure 3 is a sectional view taken on the line 3—3 of Figure 1.

Figure 4 is a fragmentary sectional view showing a control valve and pressure gauge.

Referring in detail to the drawing, the numeral 1 indicates a conventional type of piston employed in an internal combustion engine and 2 represents a crank shaft with a central oil passage therein, the crank 3 thereof being connected to the piston 1 by a connecting rod 4 constructed in accordance with the present invention. The connection between the connecting rod and the piston is through a conventional type of wrist pin 5, the latter having a comparatively tight fit both with the piston and the connecting rod and the latter also has a comparatively tight fit with the crank 3 of the crank shaft 2.

The connecting rod 4 includes sections 6 and 7. The section 7 has a conventional connection with the crank 3 and is drilled to form a lubricant passage 8 which communicates with the lubricant passage 9 of the crank shaft. The section 6 of the connecting rod is drilled to form a lubricant passage 10 which communicates with a wrist pin 5.

A plate-like member 11 is formed on the section 7 of the connecting rod and forms a closure for one end of a cylinder 12, being detachably secured to the latter. The opposite end of the cylinder 12 is closed by a head 13 slidably receiving the section 6 of the connecting rod. The piston 14 is secured to the inner end of the section 6 of the connecting rod and has a slidable fit with the wall to the cylinder and is drilled to form a radial oil passage 15, which communicates at one end with the oil passage 10 of the section 6 and its opposite end terminates in an enlargement 16 adapted to remain in communication with one end of a pipe 17 during all positions of the piston 14. The other end of the pipe 17 communicates with an oil chamber 18 and said pipe 17 is suitably mounted to the cylinder 12. A wall 19 is formed in the cylinder to define between itself and the piston 14 an oil chamber 20 and also to define in the cylinder a space 21 between itself and the plate-like member 11, the latter having a vent opening 22. A valve chamber 23 is located in the space 21 and has one end in full communication with the oil passage 8 of the section 7 of the connecting rod. A pipe 24 connects with the oil chamber 18 and the oil chamber 20 and operating in the valve chamber is a valve element 25 adapted when in one position to close the pipe 24 to the oil chamber 18 and is urged in one direction by a coil spring 26, which when extended will align a passage 27 in the valve element with the pipe 24 and with a bypass pipe 28, the latter having both ends in communication with the oil chamber 18. The bypass is equipped with a check valve 29 acting to prevent the passage of oil through said bypass in one direction but which will permit free circulation of the oil through the bypass in an opposite direction. A projection 31 is formed on the valve element to close one end of the bypass pipe 28 when said valve element is in one of its extreme positions with the passage 27 thereof out of communication with the pipe 24. A vent opening 34 provides communication between the valve chamber and the space 21.

Dash pots 37 are arranged between the piston 14 and the head 13 for the purpose of retarding the movement of the piston 14.

A stop 38 is arranged in the oil chamber 18 to limit the movement of the valve element 25 in one direction or in the direction for bringing the passage 27 thereof in communication with the bypass pipe 28 and the pipe 24.

The foregoing description sets forth a construction of connecting rods employed in internal combustion engines wherein the lubricating oil is forced through the crank shaft under pressure and when employing this invention in the engine a control valve 35 is placed in the oil system to regulate the flow of oil to the crank shaft to a selected pressure, a pressure gauge 36 being provided in the system so that the operator can at any time determine the oil pressure.

During the operation of the engine to which this invention is adapted, there will be a flow of oil from the crank shaft through the passage 8, chamber 18, pipe 17, passage 15 and passage 10 to the wrist pin 5 for the purpose of lubricating the latter. Due to the comparatively tight fit between the wrist pin and the piston and the connecting rod this oil under pressure will be resisted, therefore, permitting the lubricating system of the engine to maintain the lubricating oil under pressure, the amount depending on the capacity of the lubricant pump of the engine. During the operation of the engine with the oil in the chamber 18 under pressure, the valve element 25 is forced against the action of the spring 26 to assume the position, as shown in Figure 1, permitting the oil to flow into the chamber 20 by way of the pipe 24, acting on the piston 14 to force the section 6 of the connecting rod away from the section 7, thereby increasing the stroke of the piston. The pressure of the oil in the chamber 20 in the piston 14 may be regulated by the control valve 35, thereby permitting a person to readily govern or regulate the lengthening of the stroke of the piston and consequently varying the engine compression. On decreasing of the pressure of the oil in the chamber 18, the valve element 25 moves under the action of the spring, bringing the pipe 24 in communication with the passage 27 and the latter in communication with the bypass 28 which will permit the pressure to reduce in the chamber 20 due to the check valve 29 permitting the oil to pass into the chamber 18 from the chamber 20. At this time a check valve 40 will prevent the flow of oil from the passage 15 to chamber 18 by way of pipe 17. At other times the check valve 40 will permit the passage of oil from chamber 18 to passage 15 through the pipe 17. Thus it will be seen that through the manipulation of the control valve 25 that the pressure of oil acting on the piston 14 can be varied and thereby bring about a variation of the engine compression. The oil in the chamber 20 acting on the piston 14 also will absorb initial power impulses delivered to the piston and thereby materially reduce engine vibration.

Having described the invention, I claim:

1. In combination with a piston and a crank shaft drilled to receive oil under pressure, a connecting rod connecting the piston to the crank shaft and including sections each provided with an oil passage and one oil passage being in communication with the oil passage of the crank shaft and the other in communication with the piston, a cylinder fixed to one of the sections and slidably receiving the other section, a piston secured to the last-named section and operating in the cylinder, said cylinder having a chamber in communication with the oil passage of one of the sections, means connecting the oil passage of one of the sections to said chamber, means connecting the oil chamber to the cylinder to permit oil pressure to act on the piston for varying the stroke of the first-named piston, and means for controlling the oil pressure to said chamber.

2. In combination with an engine piston and a crank shaft drilled to form an oil passage connected with an oil pressure system, a connecting rod connected to the piston and to the crank shaft and drilled to form an oil passage and including sections, a cylinder secured to one section and slidably receiving the other section, a piston head secured to the last-named section and operating in the cylinder, a valve chamber in said cylinder and defining an oil chamber in constant communication with the oil passage of the crank shaft, means connecting said oil chamber to the passage of the section of the connecting rod connected to the engine piston, a pipe connecting the cylinder to the oil chamber, a spring-pressed valve element operating in the valve chamber for controlling said pipe, a bypass pipe connected with the valve cylinder, a check valve in said bypass pipe, said valve element having a passage adapted to connect the first-named pipe with the bypass pipe during one position of the valve element, and a pressure regulating means for controlling the oil pressure to the oil chamber of the valve chamber.

3. A yieldable connecting rod comprising a first section, a second section having an oil passage therein, a cylinder secured to the second section and slidably receiving the first section, a piston head secured to the first section and operating in the cylinder, a valve chamber in said cylinder and defining an oil chamber in constant communication with the oil passage of the second section, means connecting said oil chamber to the passage of the section of the connecting rod, a pipe connecting the cylinder to the oil chamber, a spring-pressed valve element operating in the valve chamber for controlling said pipe, a bypass pipe connected with the valve cylinder, a check valve in said bypass pipe, said valve element having a passage adapted to connect the first-named pipe with the bypass pipe during one position of the valve element, and a pressure regulating means for controlling the oil pressure to the oil chamber of the valve chamber.

GEORGE A. ANDERSON.